(12) United States Patent
Fahrion

(10) Patent No.: US 7,272,922 B2
(45) Date of Patent: Sep. 25, 2007

(54) ARTICULATED CHAIN

(76) Inventor: Otmar Fahrion, Remsstr. 11, Kornwestheim (DE) D-70806

( * ) Notice: Subject to any disclaimer, the term of this patent is extended or adjusted under 35 U.S.C. 154(b) by 273 days.

(21) Appl. No.: 10/977,602

(22) Filed: Oct. 29, 2004

(65) Prior Publication Data

US 2006/0070370 A1   Apr. 6, 2006

(51) Int. Cl.
*F16G 13/20* (2006.01)
(52) U.S. Cl. .................. 59/2; 59/78; 59/78.1; 59/95; 72/466
(58) Field of Classification Search ............ 59/3, 59/2, 78, 78.1, 95; 72/466, 478
See application file for complete search history.

(56) References Cited

U.S. PATENT DOCUMENTS

| | | | | |
|---|---|---|---|---|
| 1,276,117 A | * | 8/1918 | Riebe | 59/78.1 |
| 1,394,259 A | * | 10/1921 | Johnson | 59/78.1 |
| 1,683,573 A | * | 9/1928 | Mueller et al. | 72/466 |
| 2,451,717 A | * | 10/1948 | Check, Sr. | 72/466 |
| 2,510,198 A | | 6/1950 | Tesmer | 248/226 |
| 3,258,956 A | * | 7/1966 | Landwehr et al. | 72/466 |
| 3,315,516 A | * | 4/1967 | Sassak | 72/466 |
| 3,408,851 A | * | 11/1968 | Sassak | 72/466 |
| 3,415,107 A | * | 12/1968 | Ruscitti | 72/466 |
| 4,123,930 A | * | 11/1978 | Hill et al. | 72/466 |
| 4,475,275 A | * | 10/1984 | Edwards | 29/895.213 |
| 5,836,199 A | * | 11/1998 | Loud | 72/466 |

FOREIGN PATENT DOCUMENTS

| | | |
|---|---|---|
| DE | 50162 | 1/1890 |
| DE | 4019102 A1 | 6/1990 |
| DE | 4308181 A1 | 3/1993 |

OTHER PUBLICATIONS

Office Action dated Aug. 23, 2004 from the basic German case(3 pages).

* cited by examiner

*Primary Examiner*—David B Jones
(74) *Attorney, Agent, or Firm*—Young Basile

(57) ABSTRACT

A chain has chain links (110) having basically spherical geometry (116) and four flattened surfaces (118) equally distributed in the circumferential direction. A chamber (120) is formed in the chain links (110) in which a connecting member (112) is retained. A back side of the chain links (110) is furnished with a spherical joint surface (124). The connecting member (112) has on its side remote from the said joint surface (124) a head (150) which is furnished with a concave joint surface (162) which runs spaced apart from the outer surface of the chain link (110) and interacts with a complementarily convex joint surface (143) which is carried by the adjacent chain link (110) in the interior of the chamber (120).

33 Claims, 14 Drawing Sheets

Fig_11

ARTICULATED CHAIN

The invention relates to a chain having a plurality of chain links having first end surfaces and second end surfaces complementary thereto, and having means to hold the chain links together in such a manner that the outer surfaces of the chain links form at least one essentially continuous boundary surface.

A chain of this type is described in DE 33 21 018 C2. Such chains are suitable for circulating in a single plane which lies perpendicular to the axis of the bolts flexibly connecting the chain links.

For many applications it would be advantageous if the chain were flexible in two directions inclined to each other.

The present invention creates a chain of this kind, in which the external shape of the chain links has a basically spherical geometry and the outer surfaces of the chain links have at least at one point a flattened surface, a depression or a projection.

In the chain in accordance with the invention, the individual chain links have a geometry which permits relative motion between two successive chain links in two angular directions. Consequently, the chain as a whole can be guided on paths which may have any spatial orientation, e.g. conveyor tracks which have rising and falling sections with curves at the same time.

Advantageous elaborations of the invention are the subject of the dependent claims.

An elaboration of the invention is characterized in that the chain links are held together by internal connecting members which are connected to the adjacent chain links by joints which are concentric with the center point of the outer surface of the chain links, at least one of these joints being a ball joint.

This elaboration of the invention makes it possible to realize chains of any length by using a standard connecting part. If only one of the two joints by which one connecting part is connected to two adjacent chain links is a ball joint, while the other is a single-axis joint, chains with a high load bearing capacity can be realized in a mechanically simple manner. Each of the chain links can be one-piece, and simple assembly of the chain is still ensured.

An elaboration of the invention is characterized in that each of the chain links has an internal ball socket and the connecting members have a dome-shaped ball cap section matching the ball socket.

An elaboration of the invention is characterized in that the each of the chain links and the connecting members has a transverse pin hole and a joint pin extends through the chain link and connecting member pin holes.

An elaboration of the invention is characterized in that the pin is configured as a resilient split sleeve.

An elaboration of the invention is characterized in that the pin is configured as a flush rivet.

An elaboration of the invention is characterized in that a bearing section of the connecting member containing the pin hole can be passed through a connecting opening in the chain link leading to the ball socket.

An elaboration of the invention is characterized in that the connecting opening flares in conical fashion in an outward direction.

An elaboration of the invention is characterized in that the chain links have an insertion opening for the cap section of the connecting member and the bearing section of the connecting member is positioned essentially clearance-free in the insertion opening by a spacer.

What this elaboration of the invention accomplishes is that the connecting member is precisely positioned in the radial direction with respect to the chain link enclosing the head of the pin also at the head of the pin receiving the joint pin. The insertion opening of the chain link must on the other hand allow the insertion of the cap section of the connecting member.

An elaboration of the invention is characterized in that at least one group of chain links is held together by a flexible tension means.

In the case of a chain of this type, a flexible tension means is used to hold the chain links together. Such tension means are generally very simple in their mechanical construction and at the same time allow a large number of chain links to be held together. Chains in accordance with the invention implemented with tension means can be produced at extremely economical prices.

An elaboration of the invention is characterized in that one end of the flexible tension means is secured in a clamping head which interacts with a ball cap surface of a connecting member.

This elaboration of the invention ensures that the chain can be moved to all sides, even in the region of the ends of the flexible tension means.

An elaboration of the invention is characterized in that the tension means in the interior of the connecting member is positioned in the radial direction by a guide means.

An elaboration of the invention is characterized in that the guide means is connected to the chain link in a mechanically detachable manner.

An elaboration of the invention is characterized in that the flexible tension means is secured in a connecting member which is pinned to a chain link.

An elaboration of the invention is characterized in that the through passage is conically flared at one of its ends at least.

These elaborations of the invention are advantageous with respect to good axial centering of the flexible tension means in the chain links and preventing severe bending loads in the flexible tension means at the entry and exit point of a chain link.

An elaboration of the invention is characterized in that the chain links have at least one cam follower.

An elaboration of the invention is characterized in that at least one part of the chain links carries at least one projection.

An elaboration of the invention is characterized in that at least one part of the chain links has at least one friction coat.

An elaboration of the invention is characterized in that at least one part of the chain links has at least two different friction coats.

This elaboration of the invention is of interest with respect to implementing conveyors in which loads placed on the chains are transported by the chain surface with different degrees of friction. It may, for example, be of interest to reduce the friction between the underside of the load and the top side of the conveyor before a pile-up region of a conveyor.

An elaboration of the invention is characterized in that the chain links are made of metal.

An elaboration of the invention is characterized in that the chain links are made of steel, hardened metal, aluminum, an aluminum alloy or bronze.

An elaboration of the invention is characterized in that the chain links are precision castings.

An elaboration of the invention is characterized in that the precision cast parts are final-finished in metal-removing operations.

An elaboration of the invention is characterized in that at least some of the chain links are made of a synthetic material.

What this elaboration of the invention achieves is that the outer surfaces of the chain links have good friction properties, are resistant to chemicals, and can be endowed with good surface quality at the time of manufacture. Such chain links are also inexpensive to produce.

An elaboration of the invention is characterized in that the chain links made from a synthetic are produced by injection molding.

An elaboration of the invention is characterized in that at least part of the chain links is made of ceramic or glass.

A chain of this type has the advantage that it can be used at very high temperatures and in chemically aggressive environments.

An elaboration of the invention is characterized in that the chain links at least in the vicinity of the surface have a porous structure.

This elaboration has the advantage that the surface characteristic of the chain links can be additionally influenced by filling the pores, e.g. by introducing fluid and/or solid lubricants, corrosion-protection materials. The porous structure can also serve to modify the friction coefficients or to provide access for fluid to the underside of the load being transported. A porous structure for the chain links can also be of advantage with respect to weight reduction.

Another elaboration of the invention is characterized in that the joints under tensile load are also ball joints.

The result is that the ball joint under tensile load runs cleanly, is simple to implement and is protected against contaminant penetration.

Another elaboration of the invention is characterized in that one joint surface of an additional ball joint is configured on the chain link and the other joint surface of an additional ball joint is configured on the connecting member.

Another elaboration of the invention is characterized in that the surfaces of a chain link forming the one joint surfaces of the two ball joints are concentric and form one end wall of the concavely shaped and hollow chain link.

Another elaboration of the invention is characterized in that the additional ball joint under tensile load includes two joint washers which are located between a head section of the connecting member and a floor of a chamber of a chain link, and their contact surfaces are complementarily spherical.

Another elaboration of the invention is characterized in that the connecting members have a shank section which is connected to the chain link by a pin.

An elaboration of the invention is characterized in that the pin is configured as a resilient sleeve.

Another elaboration of the invention is characterized in that the chain links have the shape of spheres which have at least one flattened surface portion.

Another elaboration of the invention is characterized in that the chain links have a plurality of symmetrically distributed flattened surfaces portions.

The invention is hereinafter explained in greater detail on the basis of exemplary embodiments with reference to the drawing. In the drawing.

Figure 1:
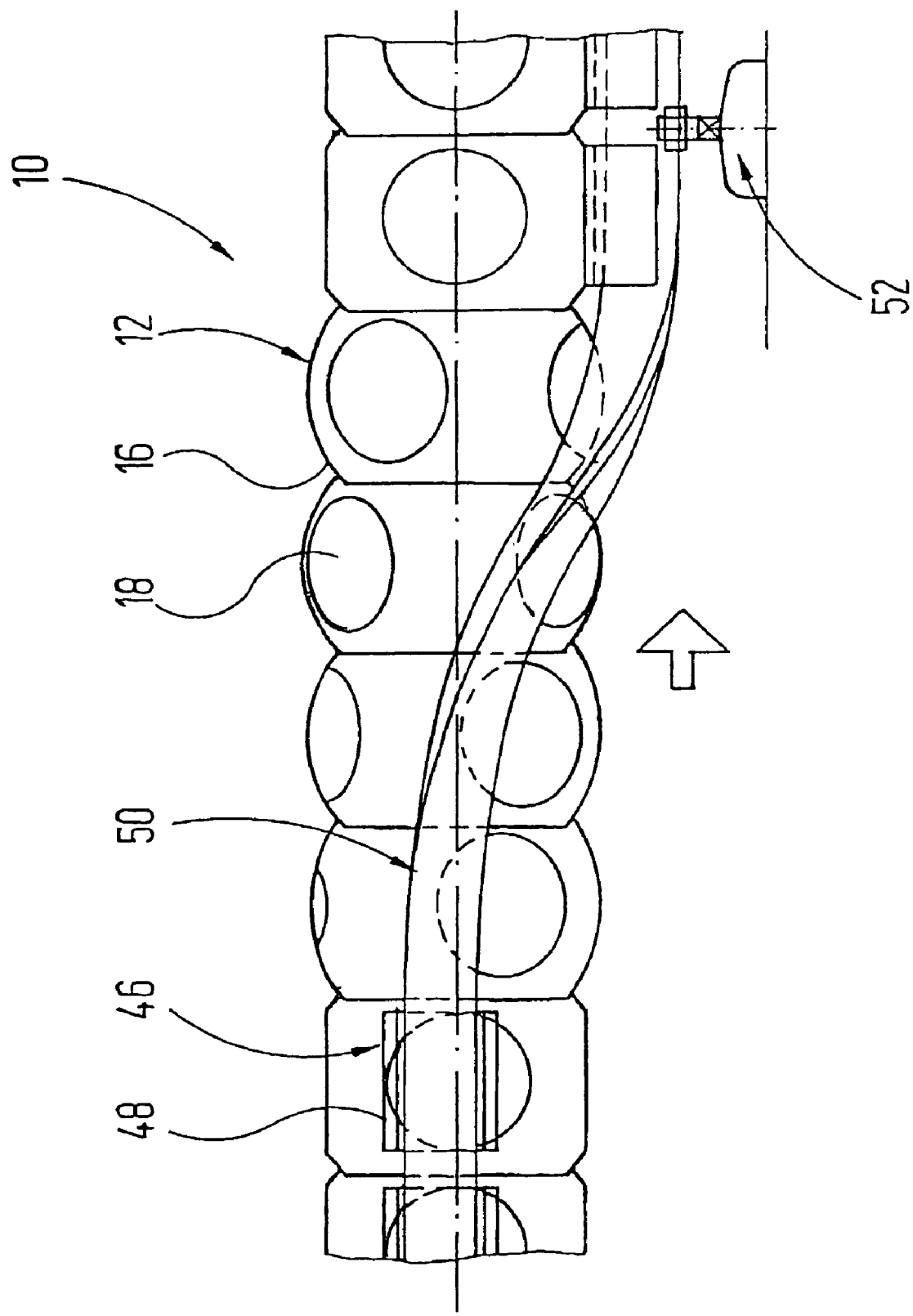
FIG. 1 is a side elevation of a chain with chain links which can be rotated in two directions relative to each other shown in an area of a conveyor track, in which rotation of the chain links takes place about 90 degrees around the longitudinal axis of the chain.
Figure 2:
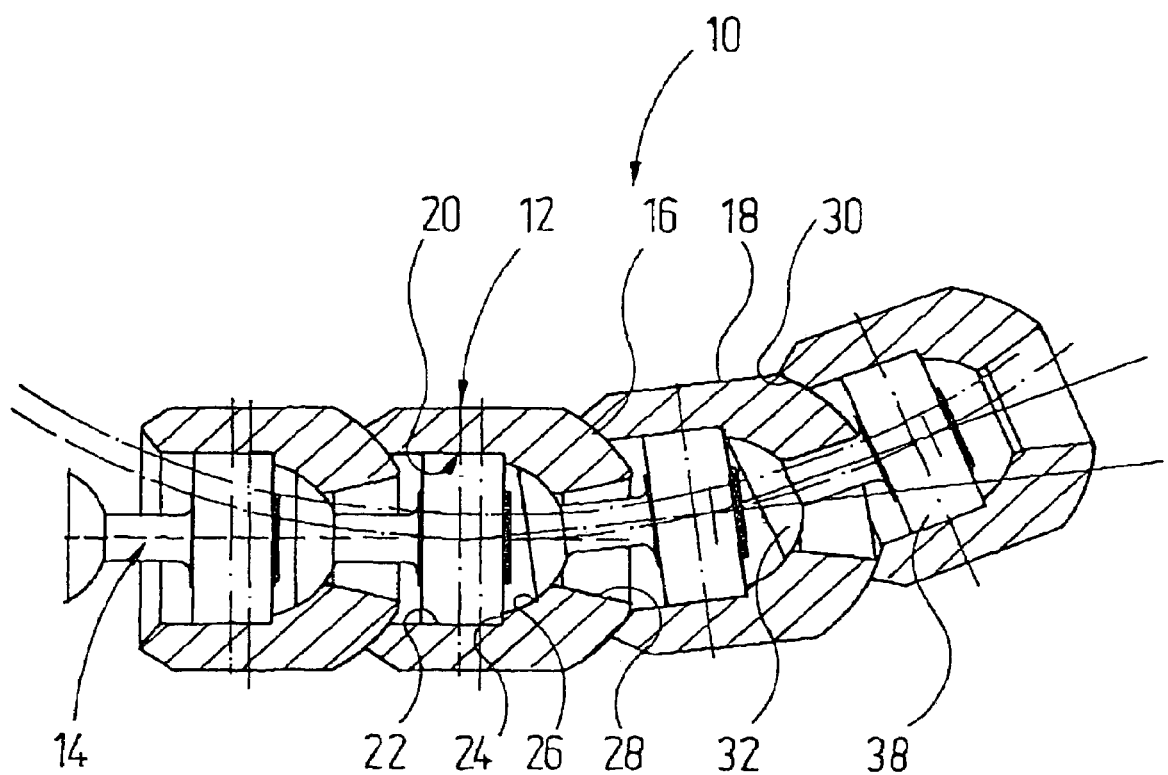
FIG. 2 is an axial section through a portion of the chain from FIG. 1.
Figure 3:
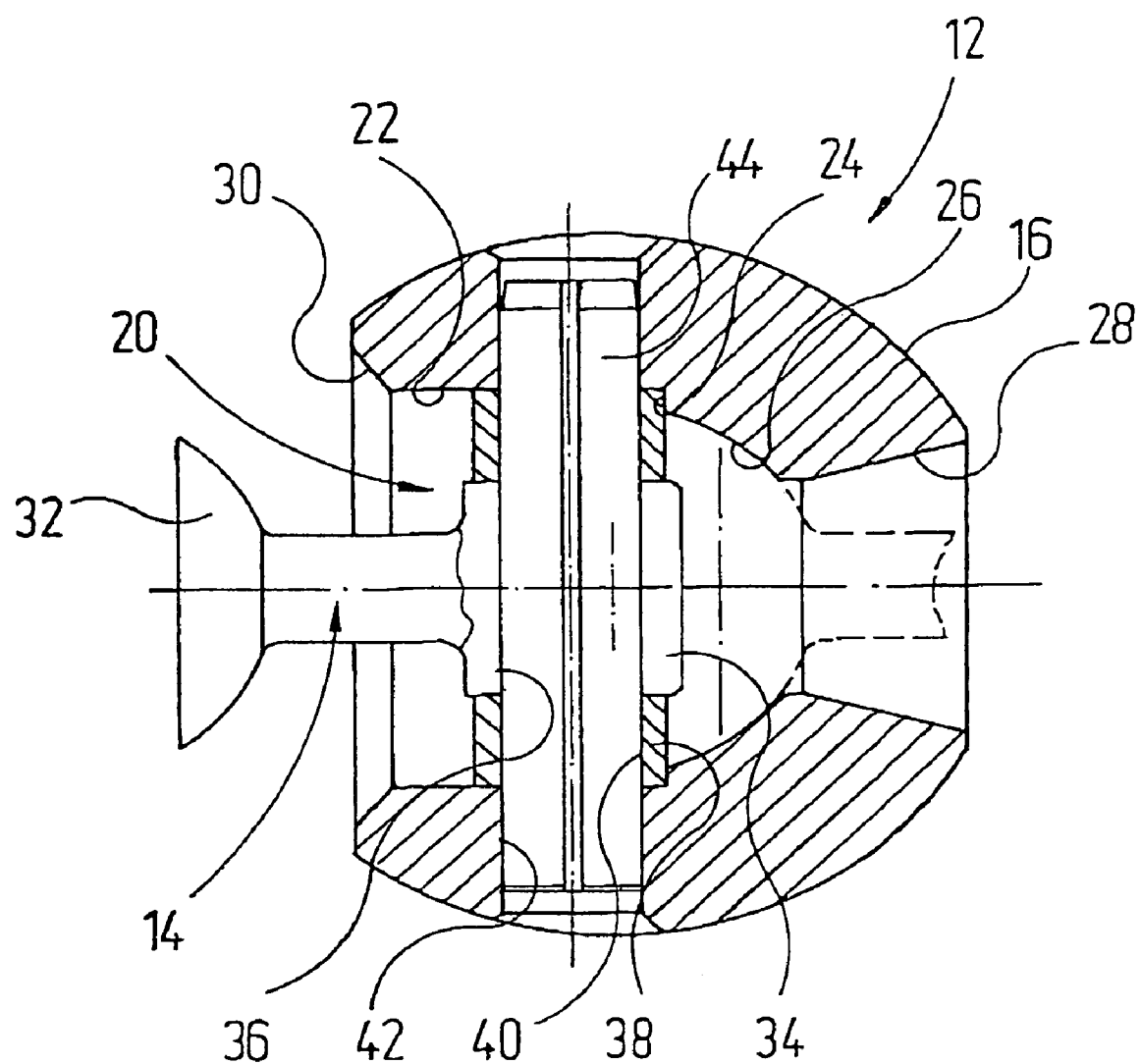
FIG. 3 is an axial section through a chain link and a connecting element attached thereto.

In FIG. 1, an articulated chain which can be bent in two directions is identified generally as 10. It comprises, following sequentially in the longitudinal direction of the chain, chain links 12 and (c.f. FIGS. 2 and 3) connecting members 14 located in the interior of the chain links 12 and holding said links together.

As can be seen from the drawing, the outer surface of the chain links 12 has a basically spherical geometry. This sphere is flattened in the circumferential direction on four surface portions spaced at 90°, as shown at 18.

A multi-stepped bore 20 is worked into the interior of the chain links 12 from the back. It comprises a first cylindrical bore segment 22 which is bounded by a shoulder 24. A bore segment 26 which has the shape of a spherical dome adjoins the shoulder 24. A bore segment 28 which expands in a conical shape toward the forward end of the chain link adjoins the bore segment 26.

An annular spherically shaped bearing surface 30 is formed at the left end of the bore segment 22 in FIG. 3. Its radius matches the radius of the geometry of the basic sphere of the chain links 12, so that the outer surface of one chain link 12 together with the bearing surface 30 of the adjacent chain link 12 forms a ball joint which can be loaded under thrust.

Each of the connecting elements 14 has a cap section 32 on the left in the drawing, which in radius matches the bearing surface determined by the bore segment 26.

On the right in FIGS. 2 and 3, the connecting links 14 have a bearing section 34 which has a pin hole 36 running perpendicular to the longitudinal axis of the connecting link 14.

The bearing section 34 has a radial dimension smaller than that corresponding to the narrowest section of the bore segment 28 so that the bearing section 34 can be moved through the bore segment 28 for assembly of the chain links and connecting members.

The bearing section 34 has a cylindrical outer surface which engages tightly in a central opening of a positioning ring 38 which for its part engages tightly in the bore segment 22 of the bore 20. The end face of the positioning ring 38 on the right in the drawing abuts the shoulder 24.

The positioning ring 38 has a pin hole 40 which, with the positioning ring abutting the shoulder 24, aligns with the pin hole 36 in the bearing section 34. In each chain link 12 there is a pin hole 42 which, with the positioning ring and connecting member 14 inserted as described above, aligns with the pin holes 36 and 40 and locates a chain pin 44 configured as a split resilient sleeve. In this way, one chain link 12 and one connecting member 14 are connected in a detachable and articulated manner.

The assembly of a two-directionally articulated chain as described above can be undertaken in the following manner:

From the left, a connecting member 14 is pushed into a chain link 12 which is to be added to one end of a chain. A positioning ring 38 is pushed into the chain link located at the end of the chain. Then the additional chain link with the additional connecting member is introduced from the left into the stepped bore 20 and the positioning ring 38, far enough so that the pin holes 36, 40 and 42 are all aligned. Then the chain pin 44 is pushed into the aligned holes, whereby it is slightly compressed radially and thus sits under spring pre-load in the pin hole 42.

The cycle described above is then repeated to attach the next chain link.

The chain is closed by attaching the last chain link to the first in similar fashion.

The individual chain links can have different diameters, depending on how the chain is used. Typically, diameters for transportation applications in which the chain is part of a conveyor lie in the range between 2 cm and 10 cm.

The ball joints of the chain can also be used to rotate the chain elements about the longitudinal axis. Such a rotation of the chain can be advantageous for instance, when the various flattened surfaces 18 of the chain links have different coefficients of friction.

FIG. 1 shows how such a rotation of the chain links can be achieved.

Guide shoes 46, which in the embodiment shown in FIG. 1 are U-shaped, are located on one of the flattened surfaces 18 of the chain links. The legs 48 of the guide shoes 46 are free to straddle the outer surface of a rectangular cross-section cam rail 50, which roughly speaking represents one quarter of a full turn of a helical line. As they follow the cam rail 50, the guide shoes 46 are displaced in accordance with the helical form of the cam rail 50, thereby resulting in a rotation of the chain links 12 about 90° in the embodiment under consideration here, as can be seen from FIG. 1.

If the guide shoes representing cam followers are attached to the chain links 12 so that they can swivel with respect to the flattened surfaces, the legs 48 can also run with a small amount of play on the cam rail 50.

As another alternative, a groove open toward the chain can be furnished on the side of the cam rail 50 facing the chain 10 and rods can be furnished on the chain links as cam followers to run in the groove with a sliding fit.

The cam rail 50 is in practice furnished in the desired area of the conveyor track and is connected to a machine frame by brackets 52 indicated schematically in FIG. 1.

Figure 4:
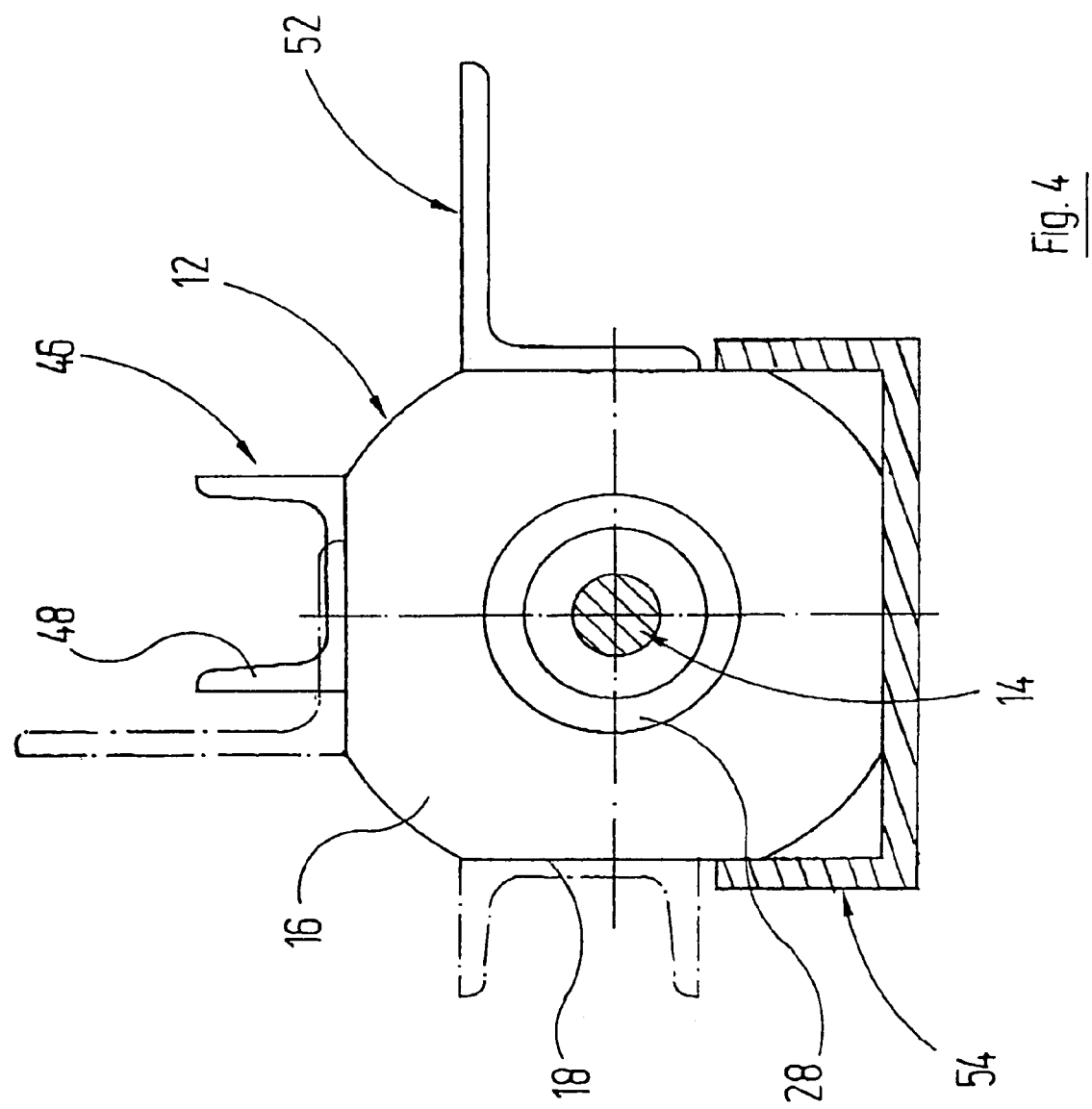
FIG. 4 is an axial view of a chain link which carries differently shaped projections on two flattened surface portions and a section through a chain support rail.

FIG. 4 shows a modified embodiment in which a chain 10 is carried in one part of its conveyor track by a support rail 54 having a U-shaped cross section. In an area of the conveyor track lying behind the support rail 54, the chains 12 are then rotated in a way similar to the method described with reference to FIG. 1. In this way, angle brackets attached to another of the flattened surfaces 18, on which for instance workpieces to be transported are secured, can be moved from the first position shown in FIG. 4 to a second position indicated in FIG. 4 by broken lines.

The running and transporting properties of the various flattened surfaces 18 can be selected to be different by giving these surfaces different degrees of roughness. This can be done directly during precision casting, injection molding or the like, or be ensured by suitable mechanical metal-removing operations.

Figure 5:
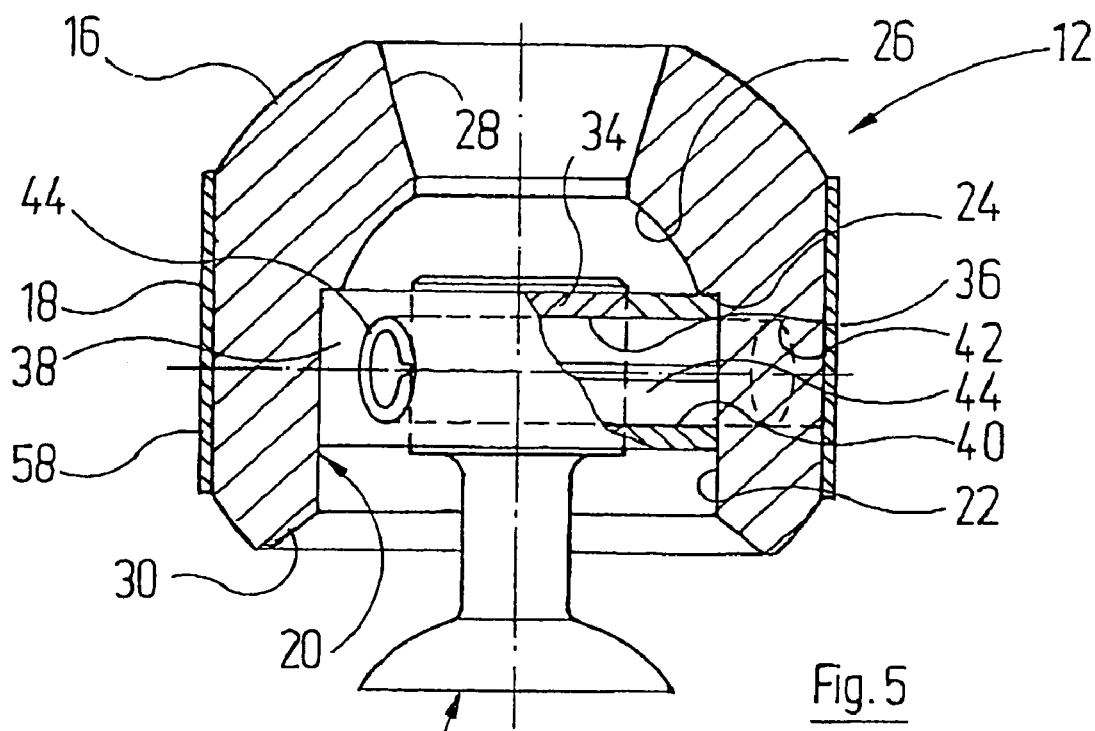
FIG. 5 is a view similar to FIG. 3, in which a modified chain link is shown which is provided with a coating on four flattened surface portions thereof.
Figure 6:
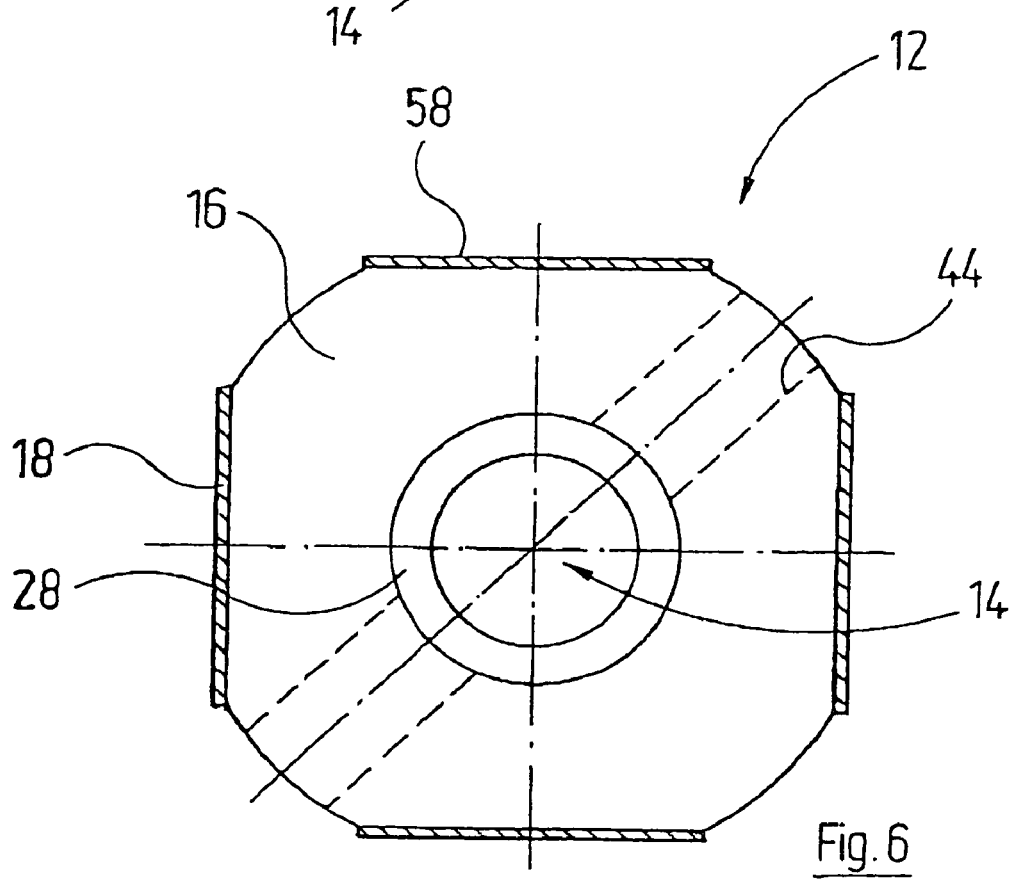
FIG. 6 is an axial view of the chain link of FIG. 5.

In the embodiment in accordance with FIGS. 5 and 6, different characteristics are achieved in the surface properties for the four flattened surfaces 18 by arranging different coatings 58 thereon.

So by rotating the chain links 16 about their longitudinal axis as described above, the running and dragging properties of the loading platform surface can be modified.

Figure 7:
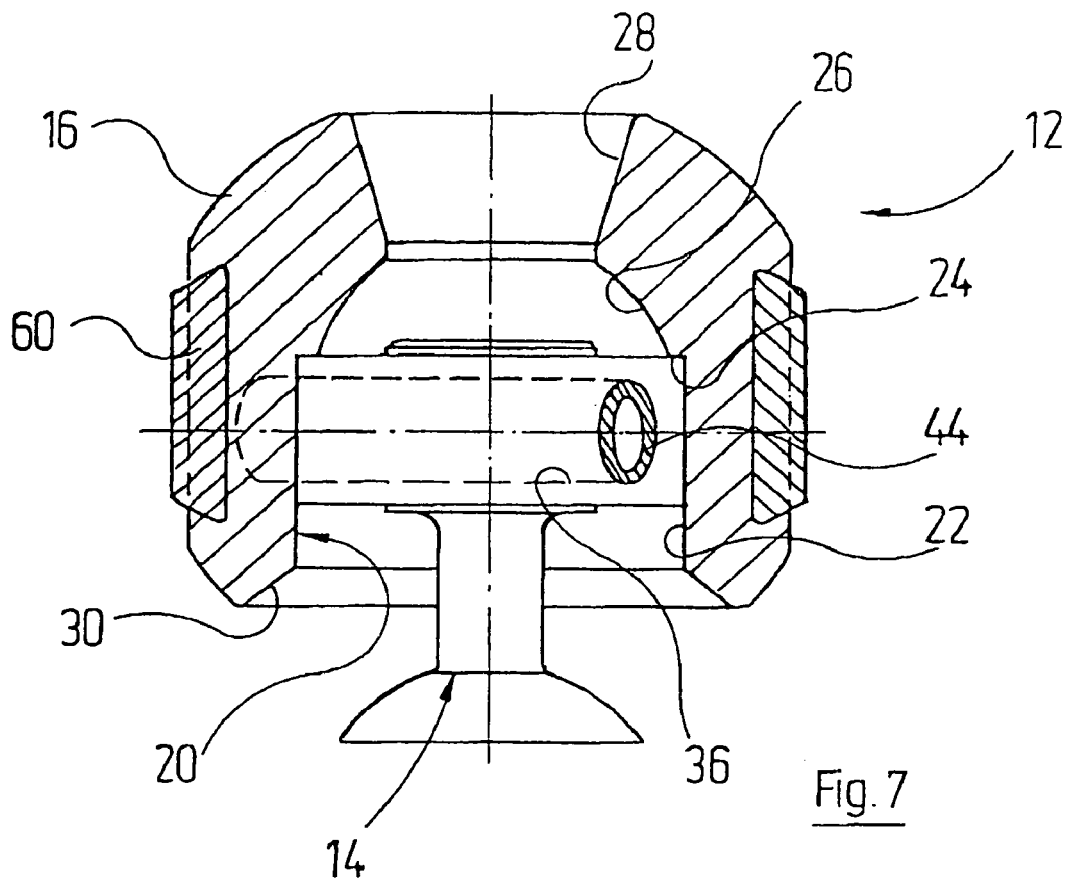
FIG. 7 is a view similar to FIG. 3, showing another modified chain link provided with four plates inserted in the region of its flattened surfaces.
Figure 8:
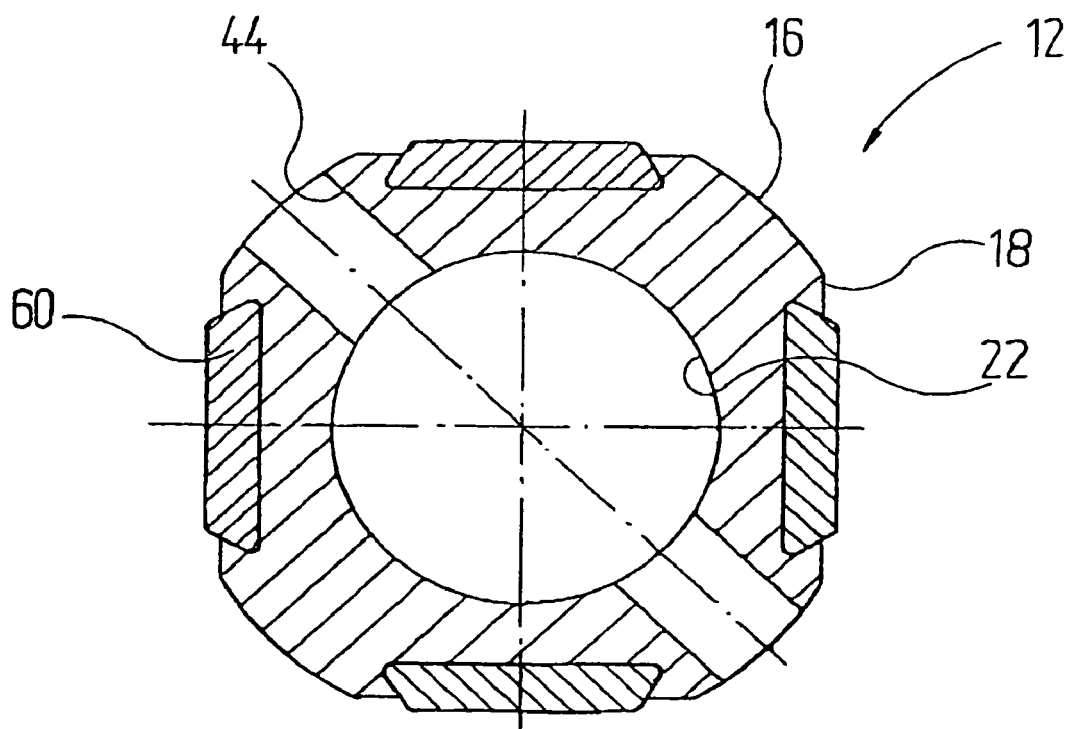
FIG. 8 is a transverse axial section through the chain link shown in FIG. 7.

FIGS. 7 and 8 show an embodiment in which the running and transporting properties of the four lateral surfaces can be adjusted differently, but where instead of applied coatings 58, keyed plates 60 are furnished, which are positively inserted in the body of the chain links 12.

Figure 9:
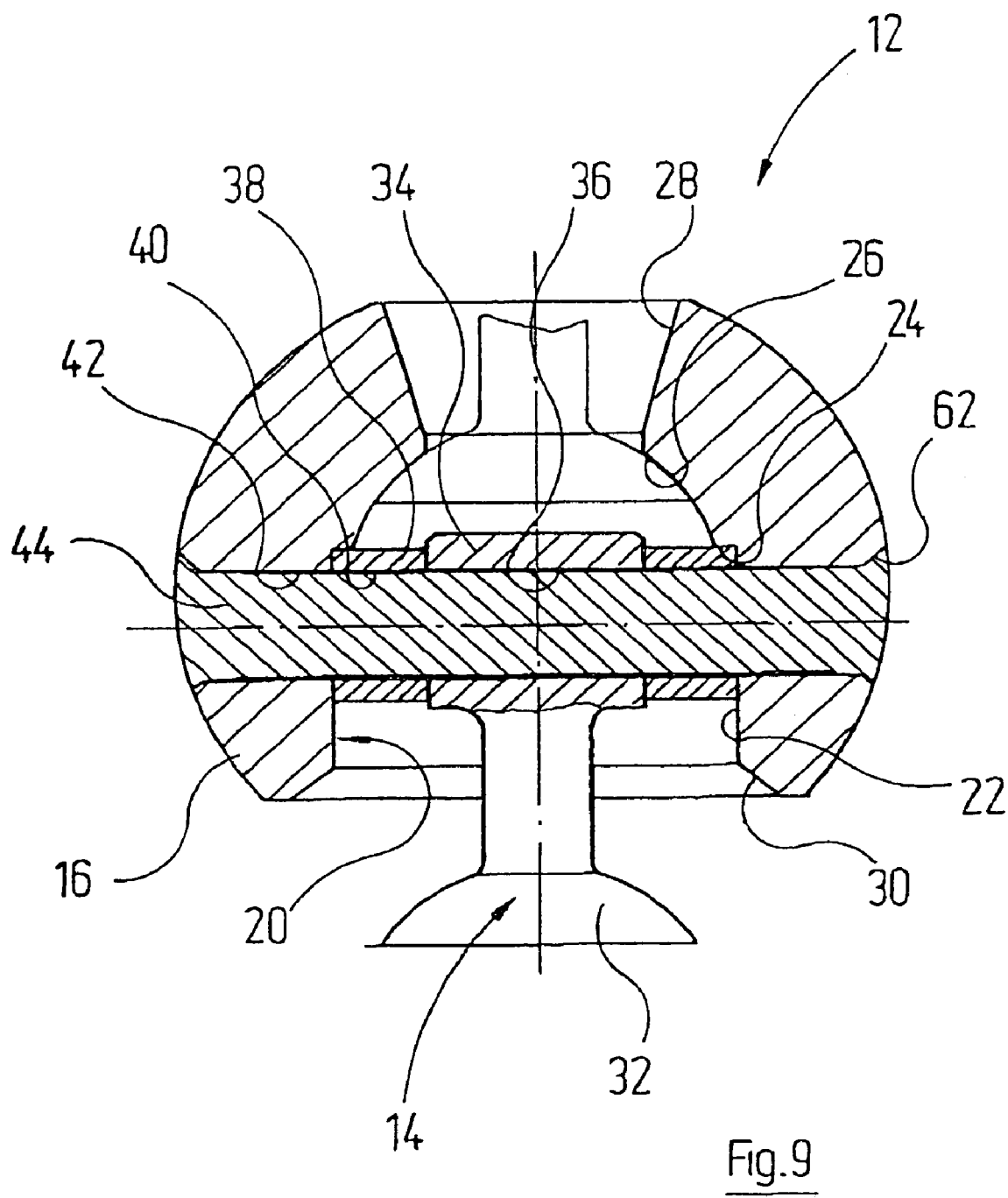
FIG. 9 is a view similar to FIG. 3, showing a modified connection between a chain link and a connecting member.

FIG. 9 shows a modification in the type of connection between the bearing section 34 of a connecting member 14 and the chain link 12 surrounding said section. The chain pin 44 is configured as a solid pin of deformable material and its ends are riveted in the manner of a countersunk rivet in depressions 62 in the pin hole 42.

Figure 10:
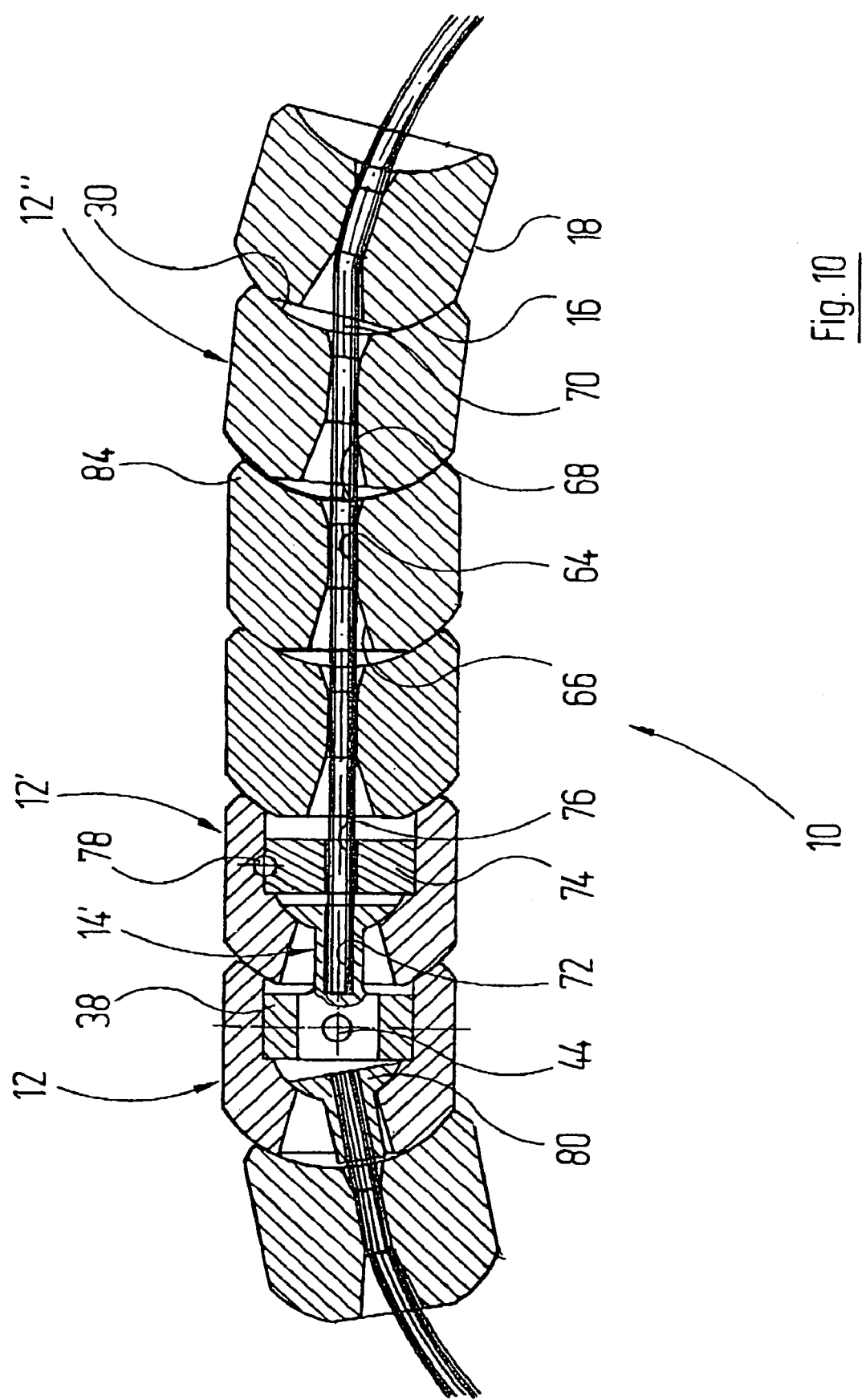
FIG. 10 is a view similar to FIG. 1, showing a modified chain in which the individual chain links are held together by a central steel cable.

A modified chain, in which the various chain links are held together by a single component, is illustrated in FIG. 10. Chain components which were explained above with reference to FIGS. 1 to 9 are given the same reference numerals again and do not need to be described again in detail hereinafter.

The chain shown in FIG. 10 comprises two chain links 12 and 12', which are configured identically or similarly to the chain links 10 from the figures previously described. The chain links 12 and 12' represent the point where the chain is closed. The remaining chain links 12" are configured as largely solid pieces and have a central passage 64 which is flared toward the forward and rear end, as shown at 64 and 68.

A steel cable 70, the diameter of which is slightly smaller than that of the passages 64, extends through the chain links 12".

One end of the steel cable 70 is captured by the cap section 32 in a connecting member 14' which has the same construction as the one described above, with the single exception that a blind hole 72 extends from the back side of the cap section 32, the one end of the steel cable 70 being soldered with brazing solder in said hole.

In order to support the steel cable 70 in the radial direction before it enters the connecting member 14', a positioning ring 74 is located in bore segment 22 of the bore 20 of the chain link 12", said ring having a center passage 76 the dimensions of which matches the passages 64. The positioning ring 74 is captured by a pin 78 in the bore 20.

The other end of the steel cable 70 is soldered with brazing solder in an end piece 80 which is configured at its free end similarly to the cap section 32 of a connecting member 14. Together with the bore segment 26 of the chain link 12 the end piece 18 can thus form a ball joint.

Assembly of the chain shown in FIG. 10 can be performed as follows:

The end piece 80 is brazed to the one end of the steel cable 70. The cable is then pulled in through chain link 12' and pulled through the various chain links 12".

After the steel cable 70 has been pulled through the last chain link 12", the excess cable end portion is cut to specified length, using a template as required. Then the free end of the cable is brazed solid in the modified connecting member 14'. Finally, the positioning ring 38 is inserted into the bore 20 of the chain link 12' and the bearing section 34 of the modified connecting member 14' is inserted into the positioning ring 38. Then the chain link 12, its positioning ring 48 and the modified connecting member 14" are connected to each other by a chain pin 44 as described above.

A chain in accordance with FIG. 10 can be used in a similar way to a chain in accordance with FIGS. 1 to 9, where with this type of chain the preference is to introduce the drive forces directly into the row of chain links through polygonal return rollers. This keeps the forces exerted on the master link formed by chain links 12 and 12' low.

Figure 11:
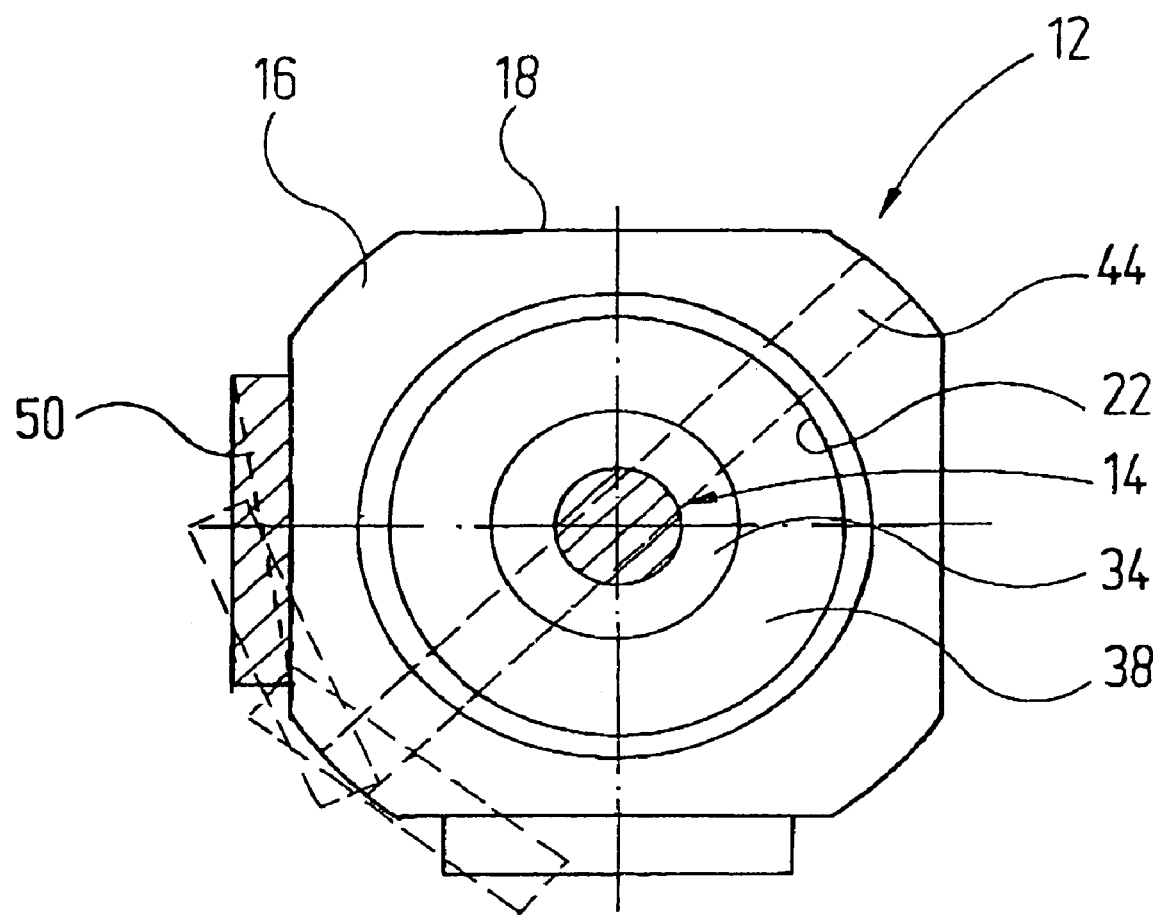
FIG. 11 is a schematic view of a chain with chain links which can be rotated relative to each other in two directions and of a spiral guide rail to rotate the chain links about 90 degrees.
Figure 12:
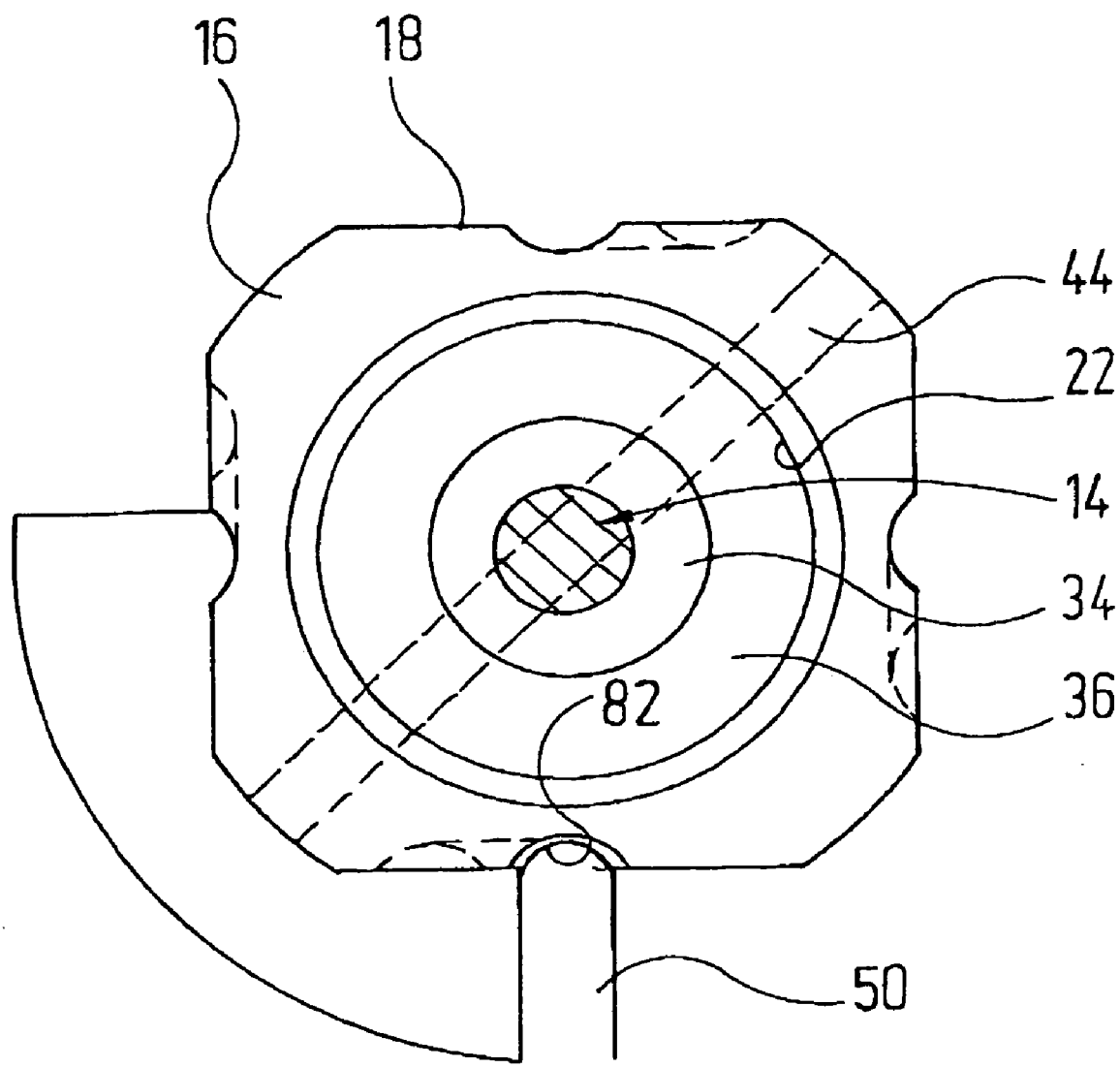
FIG. 12 is a view similar to FIG. 11 in which a ribbon-shaped cam rail is used together with grooves in the surfaces of the chain links to rotate the chain links about 90 degrees.

FIGS. 11 and 12 show two versions of a cam rail for rotating chain links:

In the embodiment of FIG. 11, a cam rail 50, which has the cross section of a flat rectangle, interacts with the flattened surface 18 on one side of the chain 10. The cam rail 50 has essentially a helical geometry, whereby the rail cross section rotates increasingly as it progresses axially, as indicated by interim profiles shown in broken lines in FIG. 11. As a result of the chain 10 being under tensile load, the chain links 12 are always assured of lying against the inner surface of the cam rail 50, and the chain links 12 are rotated about 9° in the area of the cam rail 50, as shown in FIG. 11.

With this type of rotation of the chain links 12, their outer surface does not require modification of any type.

FIG. 12 shows a further variation of the rotation of the chain links, wherein helical grooves 82 having an arcuate cross section are furnished on the chain links 12' as means of providing positive engagement. A guide rail 50 has a correspondingly rounded end section which engages the groove 82. The cam rail 50 is again curved in a helix, as explained above, so that the chain links 12 are again rotated about their longitudinal axis.

Naturally, cam rails can also be furnished running over a greater angular range than 90° in order, for instance, to exchange the top and bottom side of the chain links 12.

Figure 13:
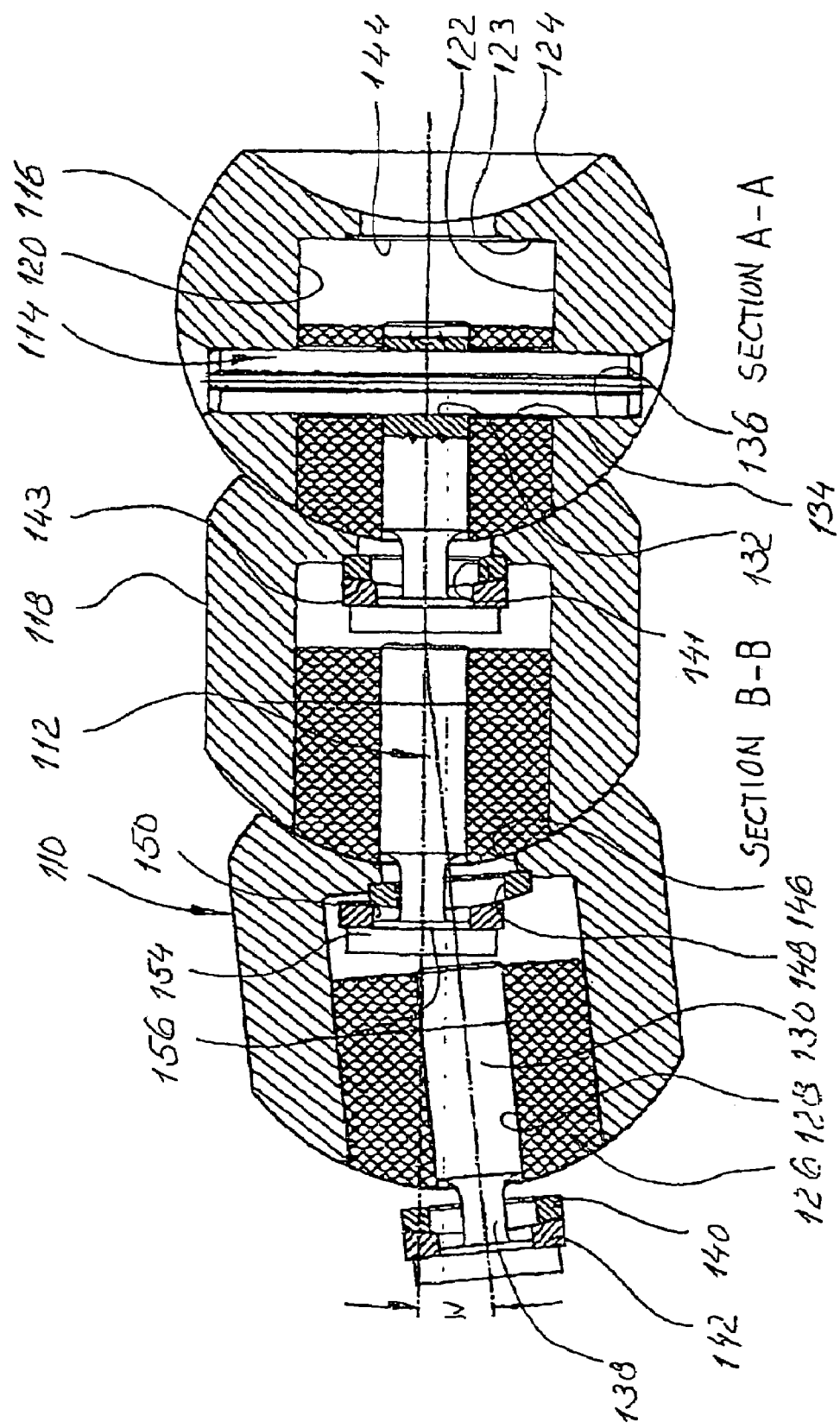
FIG. 13 is an axial section through a portion of a further ball chain, in which two of the chain links illustrated are shown sectioned in planes inclined with respect to each other.
Figure 14:
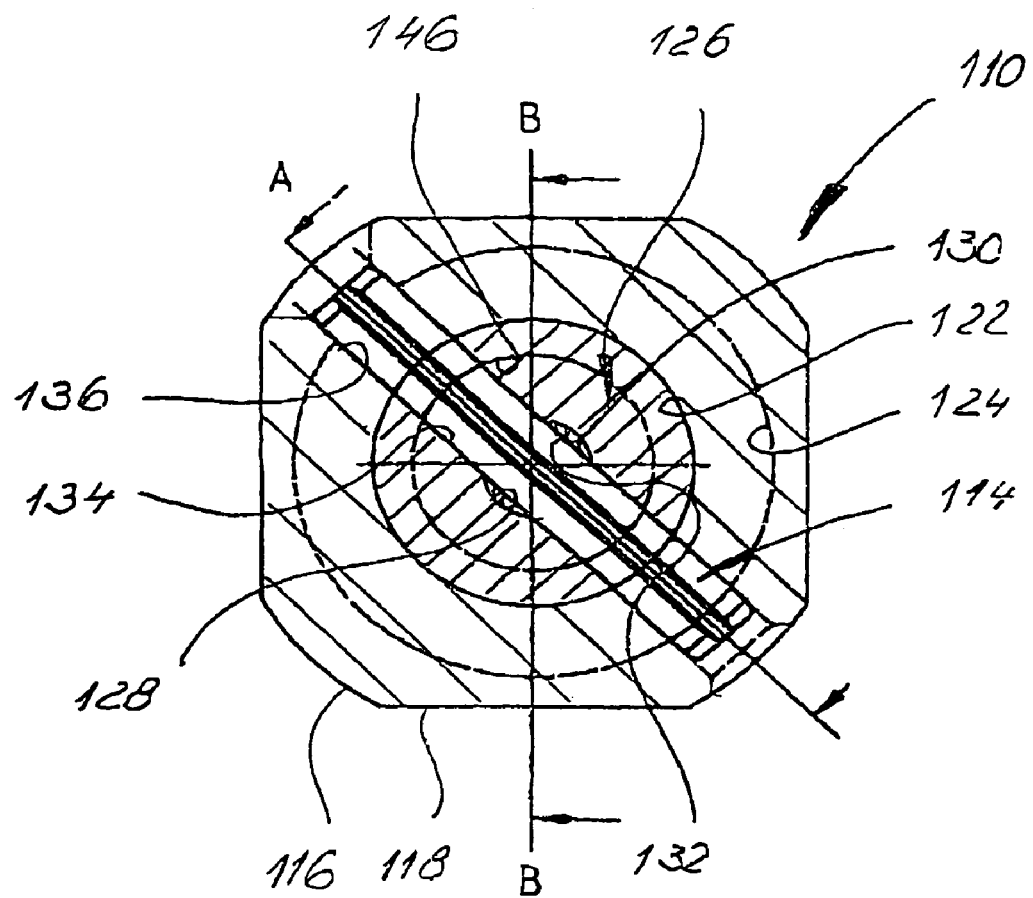
FIG. 14 is an axial view of a chain link from the chain in FIG. 13.

The chain shown in FIGS. 13 and 14 comprises chain links 110 which are connected by connecting members 112 and pins 114 configured as resilient split sleeves acting between the chain links 110 and the connecting members 112.

The chain links 110 have an essentially spherical outer surface 116 on which four flattened surfaces 118 are furnished on parallel axes, equally distributed in the circumferential direction.

A blind hole 120 is introduced into the end face of the chain links 110 shown on the left in FIG. 13. The hole has a circumferential wall 120 and a floor 123.

A concave bearing surface 124 is incorporated into the side of the chain links 110 on the right in FIG. 13, the radius of curvature of which matches the radius of curvature of the outer surface 116.

A sleeve-shaped bearing body 126 is inserted into the blind hole 120, the free end face of which is curved to match the outer surface 116 and which represents an uninterrupted continuation of the outer surface 116.

The bearing body 126 has an axial hole 128 in which a shank section 130 of an associated connecting member 112 is inserted.

The shank section 130 has a transverse pin receiving hole 132 which aligns with a transverse pin receiving hole 134 of the bearing body 126. The pin locating hole 134 of the bearing body 126 aligns with a further pin receiving hole 136 of the chain link 110. The pin receiving holes 132, 134, 136 thus define a continuous receiving hole for the pin 114. The latter is configured as an elastically resilient sleeve. In this way one chain link 110 and one connecting member 112 are rigidly connected to each other.

A shank section 138 having a reduced diameter adjoins the shank section 130, on which sit two bearing washers 140, 142. The outer end faces of the washer pair 140, 142 are both planar, and the end faces 141, 143 of the bearing washers 140, 142 abutting one another are spherical, these spherical surfaces being concentric with the outer surface 116 of the chain link 110 carrying the connecting member 112.

The planar end face of the joint washer 140, on the right in FIG. 13, sits in a small counter bore 44 which is furnished in the floor 123 of the neighboring chain link at the end of a bore 146 through which the connecting member 112 of the neighboring chain link on the right 110 extends.

The bore 146 has a diameter which is many times the diameter of the shank section 138, about three times in the embodiment illustrated. A central opening 148 of the joint washer 140 also has a diameter which is clearly larger than the diameter of the shank section 138, about two and one half times in the embodiment shown.

A head section 154 of the connecting member 112 having a slightly reduced diameter for its seating section 156 sits in the opening 150 of the left joint washer 142 shown in FIG. 13.

It can be seen that as a result of the arrangement described above, the individual chain links 110 can be tilted out of an aligned axial position by a specific angle w essentially without play. The angle w depends on the diameters of the opening 148 and of the shank section 138.

It can be seen further that adjacent chain links 110 under thrust load interact via a first ball joint which is formed by the outer surface 116 of one chain link of a pair of links, located on the right in the drawing, and the joint surface 124 of the chain link 110 located on the left in the drawing.

If, on the other hand, the chain is placed under tensile load, adjacent chain links 110 are connected by a ball joint which is formed by the spherical contact surfaces 41, 143 of the two joint washers 140, 142.

It can be seen further that the ball chain shown in FIG. 13 can be produced simply by mechanical working since the surfaces to be created in the interior of the chain links 110 have a very simple geometry. The second ball joint formed by the bearing washers 140, 142 can likewise be implemented easily since the two bearing washers 140, 142 can be produced easily on an automatic lathe and are also commercially available as standard components.

If it is desired, the bearing washer 142 can be formed on a chain link 110. Its convex spherical end surface can then be shaped at the same time as the blind hole 120 is created.

Figure 15:
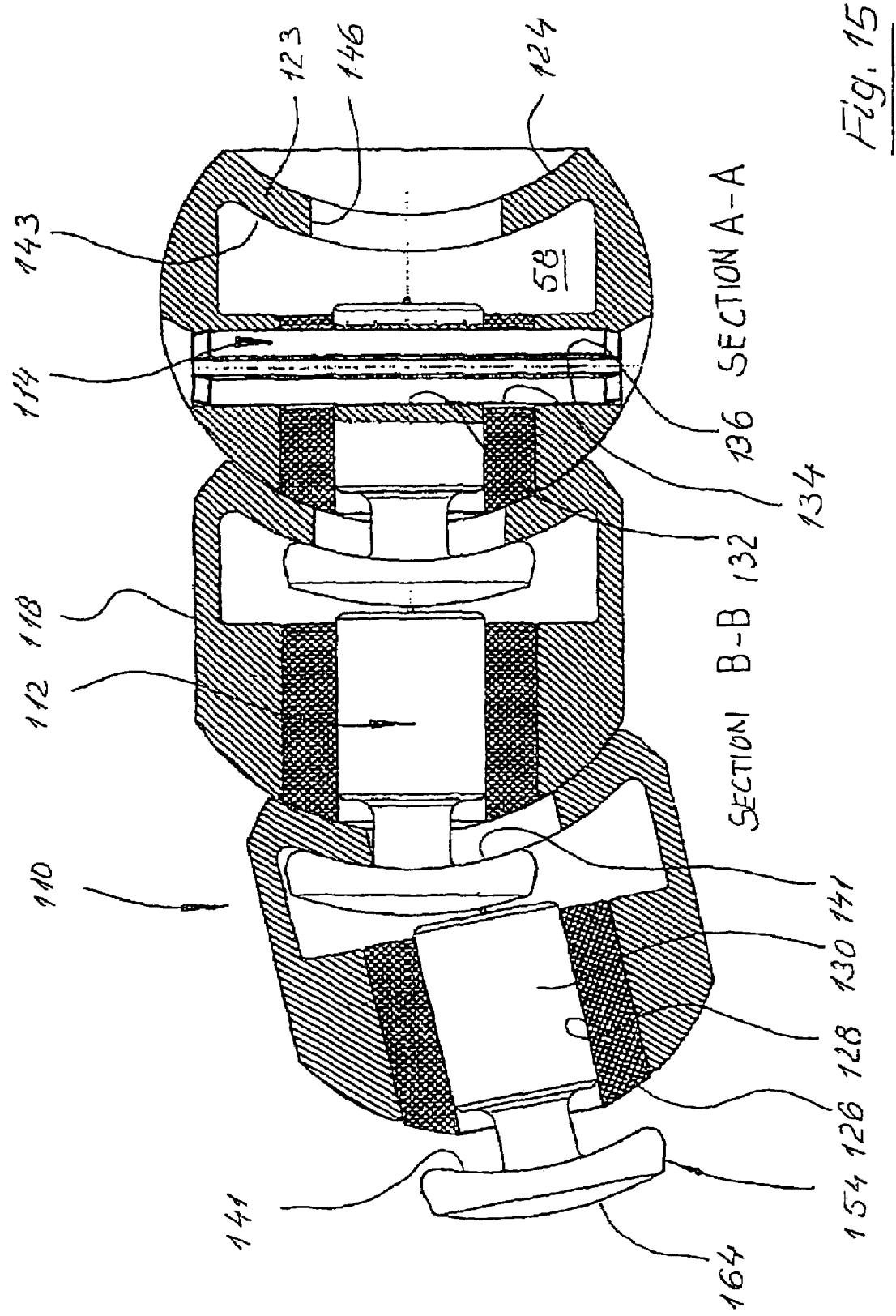
FIGS. 15 and 16 are views similar to those in FIGS. 13 and 14, showing a further modified embodiment.
Figure 16:
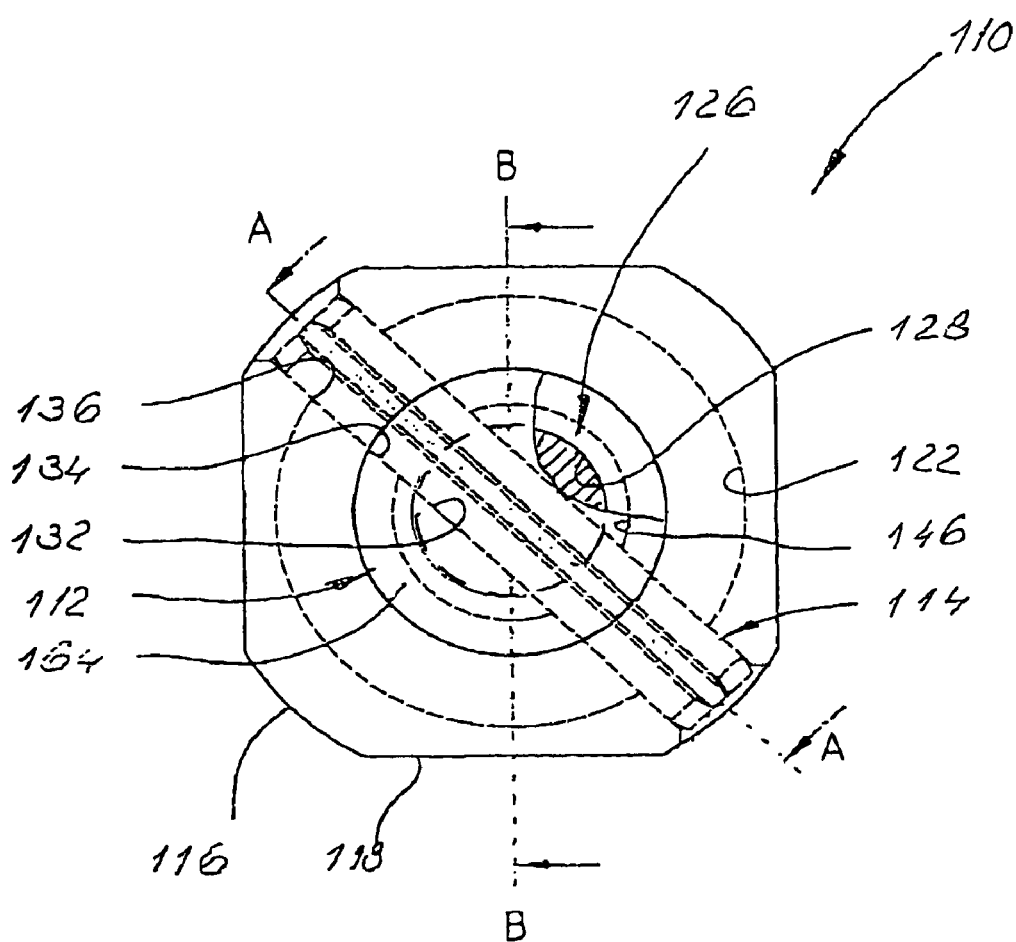

In the embodiment in accordance with FIGS. 15 and 16, parts with identical functions which were described above with reference to FIGS. 13 and 14 are given the same reference numerals. They do not need to be described again in detail hereinafter.

In the embodiment in accordance with FIGS. 15 and 16, the chain link 110 is a hollow part having a chamber 158 lying adjacent the floor 123 situated on the right in the Figures. This chamber is closed off on the right in the drawing by the spherical floor 123 which at the same time defines the bearing surface 124, which becomes active when the chain is under a thrust load, and the bearing surface 143, which becomes active when the chain is under tensile load. The latter, in a manner similar to the convex bearing surface of the bearing washer 140, interacts with a concave joint surface 141 which is formed on the back side of the head section 154.

The head section 154 of the connecting member 112 has a part spherical end face 164 which is concentric with the joint surfaces 141, 143. The end face 54 can thus lie close to the end surface of the adjacent connecting member 112, which is advantageous with respect to the compact structure of the chain links.

A link chain such as was described above is suitable for the transportation of loads along paths curved in two directions, where one of the flattened surfaces 118 is supported on a running surface which spirals at least in sections, while the opposite flattened surface 118 carries part of the load.

It can be seen that the interior of the chain links 110 is sealed reliably and well in all positions by the cooperating joint surfaces 116 and 124. Contaminants are not able to penetrate to the joint surfaces 41, 163.

Metals, synthetics and ceramic materials are suitable as material for the chain links 12 or 112. The material is selected in each case with regard to the desired mechanical volumetric properties, running characteristics, dragging of products by friction, resistance to chemical corrosion, thermal stability, appearance, etc.

The individual chain links can be produced by machining from blanks or without metal-cutting operations by casting, forging, injection molding or similar. If production did not involve metal-cutting operations, finish-machining can be performed.

Preferred metals for chain links are steels, aluminum and aluminum alloys, bronzes.

Preferred synthetics are those which combine good capacity and strength with good running properties, e.g. polyamides, PVC, polyethylenes, etc. Such synthetics furnished with a filler or a reinforcement can also be used.

Sintered materials are also of interest as material for the chain links, among them metal, synthetic and ceramic sintered materials, including glass ceramics.

When materials having a porous structure are used, the pores can be filled at least at the surface and partially with another material, for instance, a liquid or dry lubricant or an impregnation by which the pores close to the edge are sealed, or coatings which result in specific surface properties, or also paint or similar to improve the aesthetic appearance.

Coatings of this kind can also be applied only in partial areas of the outer surface of the chain link, for example, in the areas of one or several flattened surfaces which interact with objects to be transported.

In this case, elastomer coatings can also be provided which have, for instance, shock-absorbing properties.

The connecting members 14 or 114 are preferably metal components which are worked from solid or produced from cast or forged blanks and if necessary have undergone finish-machining.

The same applies to the positioning ring 38.

The chain pins 44 are standard metal components.

If desired, the connecting members 14 or 114 and the positioning rings 38 can be made from synthetic or sintered material, in particular ceramic material.

When used as a load-carrying conveyor chain, a chain such as the one described above runs on a rigid support. The individual chain links are thereby oriented on the support in such a way that their upper side is parallel to the upper side of the support, normally running parallel. The flattened surfaces 18 or 118 on the top side of the chain then form an essentially continuous linear carrying surface for loads.

A chain such as was described above can traverse rising and falling sections of a track just as well as curves on the conveyor path. It can do this because the connection between successive chain links 12 or 112 is made by using a ball joint which is defined by the bearing surface formed by the bore segment 26 or 126 and the socket section 32 or 132 of the connecting members 14 or 114.

A common feature of the chains described above is that they have an essentially closed outer side. One of the advantages is that contaminants such as chips or similar cannot reach the interior of the chain. A closed chain outer surface is also desirable to prevent accidents since articles of clothing or fingers and the like cannot become trapped.

The chains described above can be loaded equally under tension (power transmission by cap section 32 and bore segment 26) and thrust (power transmission by outer surface 16 and bearing surface 30).

The chains can either be driven in such a manner that they are engaged with their flattened surfaces by the outer surfaces of polygonal cross-section return rollers. Alternatively, the return rollers can be provided with spherical depressions which then engage the spherical surface segments of the chain elements.

In the embodiments described above, only flattened surfaces were furnished on the chain links. But it can be seen from the above description that these flattened surfaces are not necessary for the flexibility of the chain in two directions perpendicular to each other. These flattened sections were furnished to provide standing areas for loads or running surfaces for support rails or engagement surfaces for cam rails. Where these functions are not required, a chain can be used in which the chain links are spherical on the outside. Where such chains must have the potential for transporting loads, it can be provided in the form of depressions or projections which can act as means of positive engagement or attachment points.

Such means of positive engagement can also serve to ensure self-centering of the load, for instance, when the underside of a palette is furnished with studs which match depressions in the chain links, or the underside of the load has depressions which fit on an upper spherical portion of the chain links.

Where chains of the type described above are used as power transmitting components under thrust load which redirect force from one direction to another, they are preferably routed additionally in guide tubes or similar.

In the case of a chain in which the chain links are held together by a cable it may be advantageous if they are held together under additional spring pre-tension. This can be achieved either by integrating a stack of Belleville springs into one of the chain links 12, 12', or by endowing the cable itself with spring qualities.

The flexible tension means which holds the chain links together does not itself need to be a steel cable, synthetic cables or cables of other materials or flexible wires are also possible.

Wherever it is matter of a particularly tight sliding contact between successive chain links, an elastomer seal ring, as indicated at 84 in FIG. 10, can be inserted into one of the interacting ball surfaces of successive chain links.

It was assumed in the case of the embodiments described above that the links of a chain were all identical and that in the case of chains with chain links exhibiting difference coefficients of friction on their flattened surfaces, the flattened surfaces of successive chain links were all aligned similarly.

It is clear that a chain of the type described above can also be assembled from chain links formed differently with respect to their outer surface. For instance, only every third chain link can be furnished with a coating selected for good frictional adhesion, while the other chain links are not given a coating of this kind.

The same applies to brackets used to position loads. They do not need to be furnished at each of the chain links.

The materials from which the chain links are made can be selected differently in each instance. For instance, if so desired, every second chain link can be made of a synthetic with lower friction while the other chain links are made of metal, for instance steel.

What is claimed is:

1. A chain comprising a plurality of chain links having first end surfaces and second end surfaces complementary thereto defining a joint and having means to hold the chain links together in such a manner that outer surfaces of the chain links form at least one essentially continuous boundary surface, the outer surfaces of the chain links having a basically spherical geometry and at least one of a flattened surface, a depression, and a projection. wherein the chain links are held together by internal connecting links connected by way of joints to adjacent chain links which are concentric to the a center point of the outer surface of the chain links, where at least one of these joints is a ball joint.

2. Chain of claim 1, wherein the chain links have an internal ball socket and the connecting links have a spherical cap section matching the ball socket.

3. A chain comprising a plurality of chain links having first end surfaces and second end surfaces complementary thereto defining a ioint, and connecting links connecting the chain links together in such a manner that outer surfaces of the chain links form at least one essentially continuous boundary surface, the outer surfaces of the chain links having a basically spherical geometry and at least one of a flattened surface, a depression, and a projection, wherein the chain links and the connecting links have a transverse pin hole and a joint pin extends though the pin hole of the chain link and connecting link.

4. Chain of claim 3, wherein the joint pin is configured as a resilient split sleeve.

5. Chain of claim 3, wherein the joint pin is configured as a countersunk rivet.

6. Chain of claim 3, wherein the chain link comprises a ball socket and a connecting opening leading to the ball socket, and the connecting link containing the pin hole comprises a bearing section adapted to be passed through the connecting opening in the chain link.

7. Chain of claim 6, wherein the connecting opening flares conically in an outward direction.

8. Chain of claim 6, wherein the chain links have an insertion opening for the cap section of the connecting link and the bearing section of the connecting link is positioned essentially without play in the insertion opening by means of a spacer.

9. A chain comprising a plurality of chain links having first end surfaces and second end surfaces complementary thereto defining a joint and having means to hold the chain links together in such a manner that outer surfaces of the chain links form at least one essentially continuous boundary surface, the outer surfaces of the chain links having a basically spherical geometry and at least one of a flattened surface, a depression, and a projection, and at least one connecting member having a ball cap surface, at least two of the chain links being held together by a flexible tension means, wherein one end of the flexible tension means is captured in a retaining head which interacts with the ball cap surface of the connecting member.

10. Chain of claim 9, wherein the tension means is located within an interior of the connecting member and is positioned in a radial direction by a guide means.

11. Chain of claim 10, wherein the guide means is connected mechanically detachable to the chain link.

12. Chain comprising a plurality of chain links having first end surfaces and second end surfaces complementary thereto defining a joint and having means to hold the chain links together in such a manner that outer surfaces of the chain links form at least one essentially continuous boundary surface, the outer surfaces of the chain links having a basically spherical geometry and at least one of a flattened surface, a depression, and a projection, and a connecting member that is pinned to at least one of the chain links, at least two of the chain links being held together by a flexible tension means, wherein the flexible tension means is captured in the connecting member.

13. Chain of claim 9, wherein the chain links held together by the flexible tensioning means have a through passage which surrounds the tension means under a clearance which is small as compared to the diameter of the passage.

14. Chain of claim 13, wherein the through passage is flared conically at one of its ends at least.

15. A chain comprising a plurality of chain links having first end surfaces and second end surfaces complementary thereto defining a joint and having means to hold the chain links together in such a manner that outer surfaces of the chain links form at least one essentially continuous boundary surface, the outer surfaces of the chain links having a basically spherical geometry and at least one of a flattened surface, a depression, and a projection, wherein the chain links have at least one cam follower component.

16. Chain comprising a plurality of chain links having first end surfaces and second end surfaces complementary thereto defining a joint and having means to hold the chain links together in such a manner that outer surfaces of the chain links form at least one essentially continuous boundary surface, the outer surfaces of the chain links having a basically spherical geometry and at least one of a flattened surface, a depression, and a projection, wherein at least part of at least one of the chain links has a friction coat.

17. Chain of claim 16, wherein at least one of the chain links has at least two different friction coats.

18. Chain of claim 1, wherein the chain links are made of metal.

19. Chain of claim 18, wherein the chain links are made of steel, hardened steel, aluminum, aluminum alloy or a bronze.

20. Chain of claim 19, wherein the chain links are precision cast parts.

21. Chain of claim 20, wherein the precision cast parts are finish-machined by metal-cutting.

22. Chain of claim 1, wherein at least one of the chain links is made of synthetic material.

23. Chain of claim 22, wherein the chain links made of synthetic material are produced by injection molding.

24. Chain of claim 1, wherein at least one portion of the chain links is produced from ceramics or glass.

25. A chain comprising a plurality of chain links having first end surfaces and second end surfaces complementary thereto defining a joint and having means to hold the chain links together in such a manner that outer surfaces of the chain links form at least one essentially continuous boundary surface, the outer surfaces of the chain links having a basically spherical geometry and at least one of a flattened surface, a depression, and a projection, wherein the chain links have a porous structure at least in the vicinity of the surface.

26. Chain of claim 1, wherein at least one of the ball joints operate under a tensile load.

27. Chain of claim 1, wherein a joint surface of a first ball joint is configured on the chain link and a joint surface of a second ball joint is configured on the connecting link.

28. Chain of claim 27, wherein the chain link further includes a second joint surface defining the second ball joint, the joint surfaces of the chain link forming the ene surfaces of the two ball joints are concentric and form one end wall of the chain link formed as a hollow member.

29. Chain of claim 26, wherein the connecting member of the at least one ball joint under tensile load includes a head section and the chain link of the at least one ball joint under tensile load includes a chamber having a floor, the at least one ball joint under tensile load contains two joint washers which are located between the head section of the connecting link and the floor of the chamber of chain link, the contact surfaces of the two joint washers are complementarily spherical.

30. A chain comprising a plurality of chain links having first end surfaces and second end surfaces complementary thereto defining a joint, and connecting members connecting the chain links together in such a manner that outer surfaces of the chain links form at least one essentially continuous boundary surface, the outer surfaces of the chain links having a basically spherical geometry and at least one of a flattened surface, a depression. and a projection, the chain links being held together by internal connecting links connected by way of joints to adjacent chain links, at least one of the joints being a ball joint operating under a tensile load, wherein the connecting link includes a shank section which is connected via a pin to the chain link.

31. Chain of claim 30, wherein the pin is configured as a resilient split sleeve.

32. Chain of claim 26, wherein the chain links have the shape of spheres which are furnished with at least one flattened surface.

33. Chain of claim 32, wherein the chain links have a plurality of symmetrically distributed flattened surfaces.

* * * * *

UNITED STATES PATENT AND TRADEMARK OFFICE
CERTIFICATE OF CORRECTION

PATENT NO. : 7,272,922 B2  Page 1 of 1
APPLICATION NO. : 10/977602
DATED : September 25, 2007
INVENTOR(S) : Fahrion It is certified that error appears in the above-identified patent and that said Letters Patent is hereby corrected as shown below:

Column 11, Line 28; In Claim 1, after "projection" delete "." and insert -- , --, therefor.
Column 11, Line 31; In Claim 1, after "to" delete "the".
Column 11, Line 38; In Claim 3, delete "ioint" and insert -- joint --, therefor.
Column 11, Line 45; In Claim 3, delete "though" and insert -- through --, therefor.
Column 13, Line 18; In Claim 28, after "the" delete "ene".
Column 14, Line 1; In Claim 29, before "chain" insert -- the --.
Column 14, Line 11; In Claim 30, after "depression" delete "." and insert -- , --, therefor.

Signed and Sealed this

Eighteenth Day of December, 2007

JON W. DUDAS
*Director of the United States Patent and Trademark Office*